United States Patent
Choi et al.

(10) Patent No.: US 11,976,386 B2
(45) Date of Patent: May 7, 2024

(54) METHOD OF STABILIZING PRECURSOR FIBER FOR PREPARING CARBON FIBER AND METHOD OF PREPARING CARBON FIBER USING THE SAME

(71) Applicant: LG CHEM, LTD., Seoul (KR)

(72) Inventors: Jae Gil Choi, Daejeon (KR); Ji Hye Shin, Daejeon (KR); Joon Hee Cho, Daejeon (KR); Su Jin Kim, Daejeon (KR); Ki Hwan Kim, Daejeon (KR); Il Ha Lee, Daejeon (KR); Myung Su Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 738 days.

(21) Appl. No.: 16/977,366

(22) PCT Filed: Apr. 23, 2019

(86) PCT No.: PCT/KR2019/004897
§ 371 (c)(1),
(2) Date: Sep. 1, 2020

(87) PCT Pub. No.: WO2019/209009
PCT Pub. Date: Oct. 31, 2019

(65) Prior Publication Data
US 2021/0108340 A1    Apr. 15, 2021

(30) Foreign Application Priority Data

Apr. 27, 2018 (KR) .................. 10-2018-0049251
Apr. 22, 2019 (KR) .................. 10-2019-0046784

(51) Int. Cl.
*D01F 9/22* (2006.01)
*C01B 32/05* (2017.01)

(52) U.S. Cl.
CPC .............. *D01F 9/225* (2013.01); *C01B 32/05* (2017.08)

(58) Field of Classification Search
CPC .................. D01F 9/225; C01B 32/05
See application file for complete search history.

(56) References Cited

U.S. PATENT DOCUMENTS

| | | | |
|---|---|---|---|
| 4,931,233 A | 6/1990 | Miyahara et al. | |
| 5,853,429 A | 12/1998 | Heine et al. | |
| 5,967,770 A | 10/1999 | Heine et al. | |
| 7,649,078 B1 | 1/2010 | Paulauskas et al. | |
| 2011/0033705 A1 | 2/2011 | Komura et al. | |
| 2012/0181162 A1 | 7/2012 | Soboleva et al. | |
| 2016/0145772 A1 | 5/2016 | Yoon et al. | |

FOREIGN PATENT DOCUMENTS

| | | |
|---|---|---|
| CN | 102704043 A | 10/2012 |
| CN | 106592020 A | 4/2017 |
| JP | S61-83320 A | 4/1986 |
| JP | H04-153327 A | 5/1992 |
| JP | H05-247730 A | 9/1993 |
| JP | H08-134190 A | 5/1996 |
| JP | H08311722 A | 11/1996 |
| JP | 2004270095 A | 9/2004 |
| JP | 2005126855 A | 5/2005 |
| JP | 2010525960 A | 7/2010 |
| JP | 2010185163 A | 8/2010 |
| JP | 2016074995 A | 5/2016 |
| JP | 2016-540131 A | 12/2016 |
| JP | 2017008429 A | 1/2017 |
| JP | 2017066546 A | 4/2017 |
| KR | 10-20100129332 A | 12/2010 |
| KR | 10-20130011072 A | 1/2013 |
| KR | 20130005161 A | 1/2013 |
| KR | 10-20130063202 A | 6/2013 |
| KR | 10-20130100588 A | 9/2013 |
| KR | 20180054109 A | 5/2018 |

OTHER PUBLICATIONS

Hua-hu Liu et al., "Oxidation and Carbonization Process on Carbon Fiber", Anhui Shouwen Carbon Fiber Co., Ltd., Anhui Chemical Industry, vol. 42, No. 3, Jun. 2016, pp. 38-39 and 42.
Rui-hua Wang et al., "Study on thermal stabilization of polyacrylonitrile fibers", Transactions of Materials and Heat Treatment, vol. 30, No. 5, Oct. 2009, pp. 5-9.

*Primary Examiner* — Stuart L Hendrickson
(74) *Attorney, Agent, or Firm* — Bryan Cave Leighton Paisner LLP

(57) ABSTRACT

A method of preparing a carbon fiber including: preparing a precursor fiber for preparing a carbon fiber; and stabilizing the precursor fiber. The stabilization of the precursor fiber includes a first stabilization phase, a second stabilization phase, a third stabilization phase, and a fourth stabilization phase, which are set at four different temperatures between a temperature at which heat starts to be generated from the stabilization reaction of the precursor fiber and a temperature at which the generation of heat is maximized. Ozone gas is input while at least one phase of the third stabilization phase and the fourth stabilization phase is carried out.

9 Claims, No Drawings

METHOD OF STABILIZING PRECURSOR FIBER FOR PREPARING CARBON FIBER AND METHOD OF PREPARING CARBON FIBER USING THE SAME

CROSS-REFERENCE TO RELATED APPLICATIONS

This application is a national stage of international application No. PCT/KR2019/004897, filed on Apr. 23, 2019, and claims priority to and the benefit of Korean Patent Application No. 10-2018-0049251, filed on Apr. 27, 2018, and Korean Patent Application No. 10-2019-0046784, filed on Apr. 22, 2019, the disclosures of which are incorporated herein by reference in their entirety.

TECHNICAL FIELD

The present application relates to a method of stabilizing a precursor fiber for preparing a carbon fiber and a method of preparing a carbon fiber using the same.

BACKGROUND

Carbon fibers are fibrous carbon materials containing the carbon element at 90% by mass or more and include fibers obtained by pyrolyzing a fibrous organic precursor prepared from polyacrylonitrile (PAN), pitch that is a hydrocarbon residue derived from petroleum and coal tar, or rayon under an inert atmosphere.

Since carbon fibers are lighter than steel and also have excellent strength, they have been widely applied in various fields such as automobile, aerospace, wind power generation, and sports. For example, as the environmental regulations for exhaust gas of automobiles have been recently strengthened due to environmental problems, there is an increasing demand for lighter vehicles with high fuel efficiency, and therefore, as a method capable of reducing the weight of vehicles without sacrificing structural and mechanical strength, a technology for use of a carbon fiber reinforced composite has attracted attention.

In general, carbon fibers are prepared by a stabilization process in which a precursor fiber is oxidatively stabilized by applying heat under an oxidizing atmosphere in order to infusibilize the fiber and a carbonization process in which the stabilized fiber is carbonized at high temperature. In addition, the resulting fiber may be subsequently subjected to a graphitization process. Examples of the precursor fiber of a carbon fiber include polyacrylonitrile (PAN), pitch, rayon, lignin, polyethylene, and the like. Among these, a PAN fiber is an optimum precursor because it has a high carbon yield of 50% or more and a high melting point and can prepare high-performance carbon fiber by adjusting process conditions compared to other precursors. Therefore, currently, most carbon fibers are prepared from a PAN fiber.

However, since the raw material costs of carbon fiber are high, various unit processes are carried out in the preparation process of carbon fiber, and a long-time thermal treatment process is also involved, the final product has an expensive price range, and thus carbon fibers have a limitation in application and commercialization. Accordingly, there is an urgent need to develop a technology capable of mass production of high-performance carbon fiber at low cost.

SUMMARY

The present application is directed to providing a method of stabilizing a precursor fiber for preparing a carbon fiber and a method of preparing a carbon fiber using the same.

One aspect of the present application provides a method of stabilizing a precursor fiber for preparing a carbon fiber that includes: preparing a precursor fiber for preparing a carbon fiber; and stabilizing the precursor fiber, wherein the stabilization of the precursor fiber includes a first stabilization phase, a second stabilization phase, a third stabilization phase, and a fourth stabilization phase, which are set at four different temperatures between a temperature at which heat starts to be generated from the stabilization reaction of the precursor fiber and a temperature at which the generation of heat is maximized, and while at least one phase of the third stabilization phase and the fourth stabilization phase is carried out, ozone gas is input.

Another aspect of the present application provides a method of preparing a carbon fiber that includes: preparing a precursor fiber for preparing a carbon fiber, which has been stabilized by the above-described method; and carbonizing the stabilized precursor fiber for preparing a carbon fiber.

According to an embodiment of the present application, ozone gas is input in the stabilization of the precursor fiber for preparing a carbon fiber, so that the stabilization reaction of the precursor fiber for preparing a carbon fiber can be promoted, and a desired level of stabilization properties can be ensured in a shorter time than in the prior art.

In particular, according to an embodiment of the present application, ozone gas is input while at least one phase of the third stabilization phase and the fourth stabilization phase is carried out, so that a preferred degree of stabilization can be achieved in a short time.

In addition, according to an embodiment of the present application, ozone gas is input in the stabilization of the precursor fiber for preparing a carbon fiber, so that oxygen easily penetrates into a deep part inside the fiber due to the high diffusion rate of reactive oxygen species produced by decomposition of ozone gas, and thus oxygen distribution irregularity along a diameter direction on the fiber cross section can be alleviated.

DETAILED DESCRIPTION

Hereinafter, the present application will be described in more detail.

In describing the present application, when a component is referred to as "containing", "including", "comprising", or "having" another component, it is to be understood that the component does not exclude other components but may include other components as well, unless specifically stated otherwise.

In the preparation of a carbon fiber using a precursor fiber for preparing a carbon fiber, it is necessary to perform a stabilization process, in which a precursor fiber is thermally treated at 200° C. to 300° C. under an air (oxygen) atmosphere, prior to a carbonization process at high temperature. In the stabilization process, the fiber is subjected to cyclization, oxidation and dehydrogenation, a crosslinking reaction, and the like, and thereby has flame resistance. In general, the stabilization process requires a long time period of 60 to 120 minutes, and thus a large amount of energy is consumed. Also, since the stabilization process takes the longest time in a process of firing a carbon fiber, it plays an important role in determining the yield of a final product. Therefore, from an economical point of view, a technology for reducing a processing time of the stabilization is an important issue in the field of carbon fiber preparation.

Accordingly, the inventor of the present invention has studied a stabilization process of a precursor fiber for preparing a carbon fiber, which is capable of ensuring a desired level of stabilization properties in a shorter time than in the prior art, and the present invention has been completed based on the study.

A method for preparing a carbon fiber according to an embodiment of the present application includes: preparing a precursor fiber for preparing a carbon fiber; and stabilizing the precursor fiber, wherein the stabilization of the precursor fiber includes a first stabilization phase, a second stabilization phase, a third stabilization phase, and a fourth stabilization phase, which are set at four different temperatures between a temperature at which heat starts to be generated from the stabilization reaction of the precursor fiber and a temperature at which the generation of heat is maximized, and while at least one phase of the third stabilization phase and the fourth stabilization phase is carried out, ozone gas is input.

According to an embodiment of the present application, the precursor fiber for preparing a carbon fiber is not particularly limited as long as it can prepare a carbon fiber through a carbonization process. More specifically, the precursor fiber for preparing a carbon fiber may include one or more of a polyacrylonitrile (PAN)-based fiber, a pitch-based fiber, a rayon-based fiber, a lignin-based fiber, a cellulose-based fiber, and a polyethylene-based fiber, but the present application is not limited thereto.

The PAN-based fiber refers to a polymer containing acrylonitrile as a main component and fibers with various types of performance may be prepared by varying a process compared with other fibers. In addition, since properties greatly vary depending on the type of precursor, the pitch-based fiber may be variously applied to the preparation of general-purpose carbon fibers and high-performance carbon fibers.

The PAN-based fiber is very expensive compared to general fibers. In general, a precursor fiber cost, a stabilization process cost, a carbonization process cost, and a graphitization process cost account for 43%, 18%, 13%, and 15% of the price of carbon fiber, respectively. Therefore, in addition to a reduction in a precursor fiber cost, the stabilization process may be a key technology for reducing the price of carbon fiber. Since the stabilization process is slower than the carbonization process, it is the most energy-consuming process in the preparation of carbon fiber.

The stabilization process is a process for further stabilizing the molecular structure of fiber by reacting oxygen and the fiber to induce dehydrogenation and cyclization. Since the stabilization process using heat accounts for most of the total process time in the preparation of carbon fiber, research is required on a reduction in a stabilization process time.

According to an embodiment of the present application, the stabilization of the precursor fiber includes a first stabilization phase, a second stabilization phase, a third stabilization phase, and a fourth stabilization phase, which are set at four different temperatures between a temperature at which heat starts to be generated from the stabilization reaction of the precursor fiber and a temperature at which the generation of heat is maximized, and while at least one phase of the third stabilization phase and the fourth stabilization phase is carried out, ozone gas is input.

In the stabilization of the precursor fiber for preparing a carbon fiber according to an embodiment of the present application, the temperature setting for each phase is important in terms of productivity and quality. In general, when the stabilization process is carried out at relatively low temperature for a long period of time, the fiber is less likely to be damaged by heat, but the stabilization process takes a longer time, and therefore, a process temperature needs to be increased to shorten a process time. However, an excessive increase in temperature to shorten a process time may lead to degradation of the properties of the fiber caused by melting, combustion, and the like during the stabilization process.

Therefore, according to an embodiment of the present application, in order to shorten a process time, a highest temperature is determined, a degree of heat generation by the fiber at each temperature is then measured, and a temperature is set in such a way that a same amount of heat is generated in each stabilization phase and stabilization properties (typically, density) linearly increase over the phase. When the fibers that have been insufficiently reacted in a previous phase proceed to a higher-temperature phase, they are locally melted and coagulated due to rapid heat generation, thereby microscopic orientation of the fiber may be degraded. In addition, since an oxidation (dehydrogenation) reaction in the stabilization process allows polyacrylonitrile (PAN) to undergo a gradual structural change to a ladder polymer during which a double bond is formed between carbon atoms and thermal stability is reinforced, when the fibers proceed to a higher-temperature phase while having not been subjected to a sufficient oxidation (dehydrogenation) reaction in a previous phase, thermal stability may be degraded.

According to an embodiment of the present application, the first stabilization phase may be set at a temperature that differs by at most 45° C. from the temperature at which heat starts to be generated from the stabilization reaction of the precursor fiber, and temperatures for the second to fourth stabilization phases are set such that a temperature for one stabilization phase is 5° C. to 45° C. higher than a temperature for an immediately previous stabilization phase, using the temperature for the first stabilization phase as the basis for this sequential increment in temperature.

According to an embodiment of the present application, the precursor fiber is a PAN-based fiber, and the stabilization of the precursor fiber may include a first stabilization phase set at 205° C. to 240° C., a second stabilization phase set at 220° C. to 255° C., a third stabilization phase set at 235° C. to 265° C., and a fourth stabilization phase set at 250° C. to 280° C. In this case, the first stabilization phase, the second stabilization phase, the third stabilization phase, and the fourth stabilization phase are set at mutually different temperatures.

According to an embodiment of the present application, ozone gas may be input preferably while at least one phase of the third stabilization phase and the fourth stabilization phase is carried out or while the fourth stabilization phase is carried out.

When ozone gas is input in the stabilization process, ozone is pyrolyzed at the process temperature, and thus a variety of reactive oxygen species such as oxygen radicals, monatomic oxygen, diatomic oxygen, and the like are produced. Since the oxygen radical is highly reactive due to its low activation energy for a chemical reaction, it is easily reacted with the precursor fiber to induce oxidation and dehydrogenation. Also, since the monatomic oxygen has high reactivity and high diffusion rate, it can penetrate into a deep part inside the fiber and react, and this may help alleviate the irregularities in reactivity and oxygen distribution along a diameter direction of the fiber, which may be caused by reducing a process time.

According to an embodiment of the present application, ozone gas is input in the stabilization of the precursor fiber for preparing a carbon fiber, so that the stabilization reaction of the precursor fiber for preparing a carbon fiber may be promoted, and a desired level of stabilization properties may be ensured in a shorter time than in the prior art. In particular, according to an embodiment of the present application, ozone gas is input while at least one phase of the third stabilization phase and the fourth stabilization phase is carried out, so that a preferred degree of stabilization may be achieved in a short time.

According to an embodiment of the present application, the stabilization of the precursor fiber for preparing a carbon fiber may be carried out for 60 minutes or less, specifically, 50 minutes or less. In addition, the first to fourth stabilization phases may be each independently carried out for 15 minutes or less, 13 minutes or less, specifically, 11 minutes. When the stabilization of the precursor fiber for preparing a carbon fiber is carried out for more than 60 minutes, productivity may be lowered compared to a conventional process.

According to an embodiment of the present application, the stabilization of the precursor fiber for preparing a carbon fiber may be carried out in a batch-type oven or by allowing the precursor fiber to continuously pass through a plurality of ovens set at mutually different temperatures. In addition, the oven may be a hot air oven with high heat insulation.

In a conventional stabilization process, thermal treatment is carried out in a hot air oven having a constant atmospheric flow therein under the conditions of high heat insulation and an air atmosphere for 60 to 120 minutes. On the other hand, in the stabilization process according to an embodiment of the present application, thermal treatment is not carried out simply under an air atmosphere, but carried out by inputting ozone gas supplied from an ozone generator into the oven while adjusting an input period of the ozone gas, that is, by inputting the ozone gas selectively in the latter stabilization phases set at high temperature, so that activated oxygens are produced by pyrolysis of the ozone gas, and thus stabilization properties may be enhanced compared to a conventional process for the same time.

According to an embodiment of the present application, the concentration of ozone gas may be 450 ppm or more, 450 ppm to 3,000 ppm, or 550 ppm to 2,500 ppm at 15° C., with the range of 550 ppm to 2,500 ppm being preferred. When the above-described concentration range is satisfied, not only the stabilization process can be easily carried out but also the tensile strength, elasticity, and elongation rate of carbon fiber can be significantly improved. Below the above-described concentration range, an effect of improving stabilization properties caused by the input of ozone gas may be negligible, and above the above-described concentration range, the content of oxygen in the stabilized fiber is excessively increased, and thus a subsequent carbonization process proceeds while oxygen and carbon are combined, thereby the yield of carbon may be lowered.

The ozone gas may be input from an ozone generator through a tube that connects the ozone generator and an oven where the stabilization process is carried out. The concentration of the ozone gas may be measured using OZM-7000GN commercially available from Okitrotec Co., Ltd.

In addition, a method of preparing a carbon fiber according to an embodiment of the present application includes the steps of: preparing a precursor fiber for preparing a carbon fiber, which has been stabilized by the above-described method; and carbonizing the stabilized precursor fiber for preparing a carbon fiber.

According to an embodiment of the present application, the carbonization is carried out using a method known in the art and is not particularly limited to a particular method. More specifically, the carbonization may be carried out by carbonizing the stabilized precursor fiber for preparing a carbon fiber with heat energy or microwave radiation, but the present application is not limited thereto.

The carbonization process may proceed in a carbonization furnace or the like under an inert (such as nitrogen and the like) atmosphere. The inert (such as nitrogen and the like) atmosphere is maintained because the addition of another reactive gas causes an unnecessary chemical reaction, which acts as a large disadvantage in the carbonization.

In addition, a temperature for the carbonization process may be 600° C. or more. More specifically, the temperature may be 700° C. to 2,000° C., preferably, 800° C. to 1,500° C. Within the above-described temperature range, the precursor fiber for preparing a carbon fiber may be carbonized (hereinafter, referred to as a carbonization process). In this case, the carbonization process may be classified into a low-temperature carbonization process and a high-temperature carbonization process according to a carbonization temperature. In the case of the low-temperature carbonization process, the precursor may be carbonized at 600° C. to 900° C., and in the case of the high-temperature carbonization process, the precursor may be carbonized at 1,000° C. to 1,500° C.

Hereinafter, the configurations of the present application will be described in further detail with reference to embodiments thereof. However, it should be understood that the following embodiments disclosed herein are not intended to limit the scope of the present application.

Example 1

<Stabilization>

A stabilization process was carried out using a 12 k PAN fiber as a raw material to prepare a stabilized fiber.

Specifically, both of the ends of a fiber were knotted and cut into a length of about 20 cm. The resulting fiber was placed between molding jigs with a hole configured to hang a weight for applying tension, and a screw was tightened. Afterward, 1 kg weights were hung on the jigs joined at both of the ends of the fiber.

A stabilization process was carried out utilizing a batch-type oven with hot air blowing from a rear direction to a front direction. A temperature condition was set at 235° C. for a first stabilization phase, 250° C. for a second stabilization phase, 260° C. for a third stabilization phase, and 270° C. for a fourth stabilization phase. A time allowed for temperature elevation until a programmed temperature of the oven was reached was set to 1 minute, and a residence time in each phase was set to a time obtained by subtracting the temperature elevation time of 1 minute from a time corresponding to ¼ of the total process time. Therefore, each of the first to fourth stabilization phases was devised such that it consists of a set including temperature elevation for 1 minute and subsequent residence for 10 minutes, in which case the total processing time of the stabilization was 44 minutes.

While the third stabilization phase was carried out, ozone gas was input.

Ozone gas was allowed to be supplied to the fiber through a shower head positioned at the top of the inside of the oven by opening the gas valve connected to an ozone generator during an input period thereof, that is, from a time point when a temperature starts to be raised to a time point when a temperature starts to be raised in the next phase. PC-57 commercially available from OzoneTech was used as the ozone generator, a pressure inside the generator was set to 1 kg/cm$^2$, a flow rate of input oxygen was set to 3 L/min, and a discharge current was set to 3.2 A. Under the above-described setting conditions, the concentration of ozone gas in the oven was 2,197 ppm, as measured at 15° C. In this case, the concentration of ozone gas was measured using OZM-7000GN commercially available from Okitrotec Co., Ltd.

<Carbonization>

Carbon paper made of graphite was cut into an appropriate size, the stabilized fibers were arranged in parallel, and a carbon tape was then applied in a direction perpendicular to the fiber to immobilize the sample. Afterward, the carbon paper was folded to separate the stabilized fibers in such a way that individual stabilized fiber was contained in a separate space, and connected to a commercially available carbon fiber, and purging was carried out in a carbonization furnace under a nitrogen atmosphere for 20 minutes. The carbonization furnace is a combination of an electric furnace in a Joule heating manner and a quartz tube and the temperature thereof was set at 1,200° C. After purging was finished, the carbon fiber was wound at a constant speed in such a way that the carbon paper including the stabilized fibers was positioned at the center of the carbonization furnace, and the carbon paper was allowed to stand for 5 minutes to prepare a carbon fiber.

Example 2

A stabilized fiber and a carbon fiber were prepared in the same manner as in Example 1 except that ozone gas was input while a fourth stabilization phase instead of a third stabilization phase was carried out.

Example 3

<Stabilization>

A stabilization process was carried out using a PAN fiber as a raw material to prepare a stabilized fiber.

Specifically, a stabilization process was carried out by allowing a PAN fiber continuously wound into a paper tube to sequentially pass through first to fourth ovens that were set at four different temperatures while being moved in one direction via a running roller.

All of the first to fourth ovens were ovens with hot air circulating the inside thereof in an end-to-end manner, and a length of a heat zone was 4.5 m. The first oven was set at 222° C., and a first stabilization phase was carried out therein. The second oven was set at 237° C., and a second stabilization phase was carried out therein. The third oven was set at 247° C., and a third stabilization phase was carried out therein. The fourth oven was set at 253° C., and a fourth stabilization phase was carried out therein.

Meanwhile, the input rate of the PAN fiber in the first stabilization phase was set to 0.45 m/min. Based on the input rate of a PAN fiber, the total processing time of the stabilization was 40 minutes, and the speed of the roller was later adjusted to maintain tension at a level of 750 to 850 gf.

While the fourth stabilization phase was carried out, ozone gas was input. Ozone gas was supplied via an input tube made of SUS, which was inserted through the door of the fourth oven where the fourth stabilization phase was carried out into an inner space through which the fiber passes. Two OZE-020 apparatus commercially available from Ozone Engineering Co., Ltd. were used as the ozone generator, and, upon the input of ozone gas, a pressure inside the ozone generator was set to 1 kg/cm$^2$, a flow rate of input oxygen was set to 14 L/min, and the concentration of ozone gas in the oven was 624 ppm, as measured at 15° C. by adjusting a discharge current under the above-described setting conditions. The concentration of ozone gas was measured using OZM-7000GN commercially available from Okitrotec Co., Ltd.

<Carbonization>

The stabilized fiber thus obtained was carbonized in a continuous carbonization facility, in which two carbonization furnaces were connected in series, to prepare a carbon fiber. Specifically, the carbonization furnace is a combination of an electric furnace in a Joule heating manner and a quartz tube, and the temperatures were set at 850° C. and 1,200° C., respectively. In respective carbonization furnaces, nitrogen gas was blown at 40 L/min to prevent oxidation and combustion, and the stabilized fiber was retained in respective carbonization furnaces for 1 minute while being moved at a constant rate of 0.5 m/min via a running roller to carbonize the stabilized fiber.

Example 4

A stabilized fiber and a carbon fiber were prepared in the same manner as in Example 3 except that, upon the input of ozone gas, a pressure inside the ozone generator was set to 1 kg/cm$^2$, a flow rate of input oxygen was set to 14 L/min, and the concentration of ozone gas in the oven was 1,080 ppm, as measured at 15° C. by adjusting a discharge current under the above-described setting conditions.

Example 5

A stabilized fiber and a carbon fiber were prepared in the same manner as in Example 3 except that, upon the input of ozone gas, a pressure inside the ozone generator was set to 1 kg/cm$^2$, a flow rate of input oxygen was set to 14 L/min, and the concentration of ozone gas in the oven was 1,363 ppm, as measured at 15° C. by adjusting a discharge current under the above-described setting conditions.

Example 6

A stabilized fiber and a carbon fiber were prepared in the same manner as in Example 3 except that, upon the input of ozone gas, a pressure inside the ozone generator was set to 1 kg/cm$^2$, a flow rate of input oxygen was set to 14 L/min, and the concentration of ozone gas in the oven was 1,931 ppm, as measured at 15° C. by adjusting a discharge current under the above-described setting conditions.

Comparative Example 1

A stabilized fiber and a carbon fiber were prepared in the same manner as in Example 1 except that ozone gas was not input.

Comparative Example 2

A stabilized fiber and a carbon fiber were prepared in the same manner as in Example 1 except that ozone gas was input while a first stabilization phase instead of a third stabilization phase was carried out.

Comparative Example 3

A stabilized fiber and a carbon fiber were prepared in the same manner as in Example 1 except that ozone gas was input while a second stabilization phase instead of a third stabilization phase was carried out.

Comparative Example 4

A stabilized fiber and a carbon fiber were prepared in the same manner as in Example 1 except that ozone gas was not input, and each of the first to fourth stabilization phases was devised such that it consists of a set including temperature elevation for 1 minute and subsequent residence for 12 minutes, in which case the total processing time of the stabilization was 52 minutes.

Comparative Example 5

A stabilized fiber and a carbon fiber were prepared in the same manner as in Example 1 except that ozone gas was not input, and each of the first to fourth stabilization phases was devised such that it consists of a set including temperature elevation for 1 minute and subsequent residence for 15 minutes, in which case the total processing time of the stabilization was 64 minutes.

Comparative Example 6

A stabilized fiber and a carbon fiber were prepared in the same manner as in Example 3 except that ozone gas was not input.

Experimental Example

Properties of Carbon Fiber

The properties of carbon fibers according to Example and Comparative Examples were evaluated by the methods described below, and results thereof are shown in [Table 1] and [Table 2] below.

※ Tensile strength, Elasticity, and Elongation rate: measured by the measurement of the linear density of a single fiber and the tensile test using Favimat+ commercially available from Textechno in accordance with ASTM D 1577, ASTM D 3822, and ASTM D 3822M-14.

TABLE 1

| Classification | Examples | | | | | |
|---|---|---|---|---|---|---|
|  | 1 | 2 | 3 | 4 | 5 | 6 |
| # of ovens | 1 | 1 | 4 | 4 | 4 | 4 |
| Input period of ozone gas | Third stabilization phase | Fourth stabilization phase | Fourth stabilization phase | Fourth stabilization phase | Fourth stabilization phase | Fourth stabilization phase |
| Concentration of ozone gas | 2,197 | 2,197 | 624 | 1,080 | 1,363 | 1,931 |
| Total processing time of stabilization (min) | 44 | 44 | 40 | 40 | 40 | 40 |
| Tensile strength | 3.14 | 3.34 | 3.02 | 3.43 | 3.22 | 3.17 |
| Elasticity | 200 | 201 | 196 | 199 | 201 | 195 |
| Elongation rate | 1.77 | 1.83 | 1.68 | 1.88 | 1.75 | 1.77 |

TABLE 2

| Classification | Comparative Examples | | | | | |
|---|---|---|---|---|---|---|
|  | 1 | 2 | 3 | 4 | 5 | 6 |
| # of ovens | 1 | 1 | 1 | 1 | 1 | 4 |
| Input period of ozone gas | No input | First stabilization phase | Second stabilization phase | No input | No input | No input |
| Concentration of ozone gas | — | 2,197 | 2,197 | — | — | — |
| Total processing time of stabilization (min) | 44 | 44 | 44 | 52 | 64 | 40 |
| Tensile strength | 2.63 | 1.32 | 2.74 | 2.74 | 3.03 | 2.93 |
| Elasticity | 186 | 155 | 185 | 188 | 200 | 196 |
| Elongation rate | 1.61 | 1.1 | 1.66 | 1.63 | 1.67 | 1.61 |

Referring to Table 1 and Table 2, it can be seen that the carbon fibers according to Examples 1 and 2, in which a stabilization process is carried out in a batch-type oven and ozone gas is input while a third or fourth stabilization phase is carried out, are excellent in all of tensile strength, elasticity, and elongation rate compared to the carbon fibers according to Comparative Examples 1 to 3 in which ozone gas is not input or is input in a first or second stabilization phase. In addition, it can be seen that the carbon fibers according to Examples 1 and 2 are significantly excellent in tensile strength and elongation rate compared to the carbon fibers according to Comparative Examples 4 and 5 in which ozone gas is not input and a stabilization process is carried out for 52 minutes and 64 minutes, respectively.

In addition, it can be seen that the carbon fibers according to Examples 4 to 6, in which a stabilization process is carried out in four ovens and ozone gas is input in a fourth stabilization phase, are significantly excellent in tensile strength and elongation rate compared to the carbon fiber according to Comparative Example 6 in which ozone gas is not input. Additionally, it can be seen upon making a comparison among the carbon fibers according to Examples 3 to 6 that the carbon fibers according to Examples 4 to 6, in which the concentration of ozone gas is in a range of 1,080 to 1,931 ppm, exhibit excellent tensile strength and excellent elongation rate compared to the carbon fiber according to Example 3 in which the concentration of ozone gas is 624 ppm.

The invention claimed is:

1. A method of stabilizing a precursor fiber for preparing a carbon fiber, the method comprising:
   preparing a precursor fiber; and
   stabilizing the precursor fiber,
   wherein stabilizing the precursor fiber includes a first stabilization phase, a second stabilization phase, a third stabilization phase, and a fourth stabilization phase,
   wherein the first to fourth stabilization phases are carried out at four different temperatures selected among temperatures between a temperature at which heat starts to be generated from a stabilization reaction of the precursor fiber and a temperature at which heat generated from the stabilization reaction is maximized,
   wherein ozone gas is input while at least one phase of the third stabilization phase and the fourth stabilization phase is carried out, and
   wherein a concentration of ozone gas is 450 ppm to 3,000 ppm, as measured at 15° C.

2. The method of claim 1, wherein the first stabilization phase is set at a temperature that differs by 45° C. or less from the temperature at which heat starts to be generated from the stabilization reaction of the precursor fiber, and
   wherein each of the second to fourth stabilization phases are set at a temperature that is 5° C. to 45° C. higher than a temperature of an immediately previous stabilization phase, using the temperature for the first stabilization phase as a base temperature.

3. The method of claim 1, wherein the first to fourth stabilization phases are carried out for a total time of 60 minutes or less.

4. The method of claim 1, wherein the first to fourth stabilization phases are each independently carried out for 15 minutes or less.

5. The method of claim 1, wherein the stabilization of the precursor fiber is carried out in a batch-type oven or by allowing the precursor fiber to continuously pass through a plurality of ovens set at mutually different temperatures.

6. The method of claim 1, wherein the precursor fiber includes one or more selected from the group consisting of a polyacrylonitrile (PAN)-based fiber, a pitch-based fiber, a rayon-based fiber, a lignin-based fiber, a cellulose-based fiber, and a polyethylene-based fiber.

7. The method of claim 1, wherein the precursor fiber is a polyacrylonitrile (PAN)-based fiber,
   wherein the first stabilization phase is set at 205° C. to 240° C., the second stabilization phase is set at 220° C. to 255° C., the third stabilization phase is set at 235° C. to 265° C., and the fourth stabilization phase is set at 250° C. to 280° C., and
   where the first stabilization phase, the second stabilization phase, the third stabilization phase, and the fourth stabilization phase are set at mutually different temperatures.

8. A method of preparing a carbon fiber, comprising:
   preparing a precursor fiber for preparing a carbon fiber, wherein the precursor fiber has been stabilized by the method of claim 1 to form a stabilized precursor fiber; and
   carbonizing the stabilized precursor fiber to prepare a carbon fiber.

9. The method of claim 8, wherein the carbonization of the precursor fiber is carried out by carbonizing the stabilized precursor fiber with heat energy or microwave radiation.

* * * * *